No. 779,498. PATENTED JAN. 10, 1905.
A. T. PFEIFF.
STERILIZING APPARATUS.
APPLICATION FILED AUG. 15, 1903.
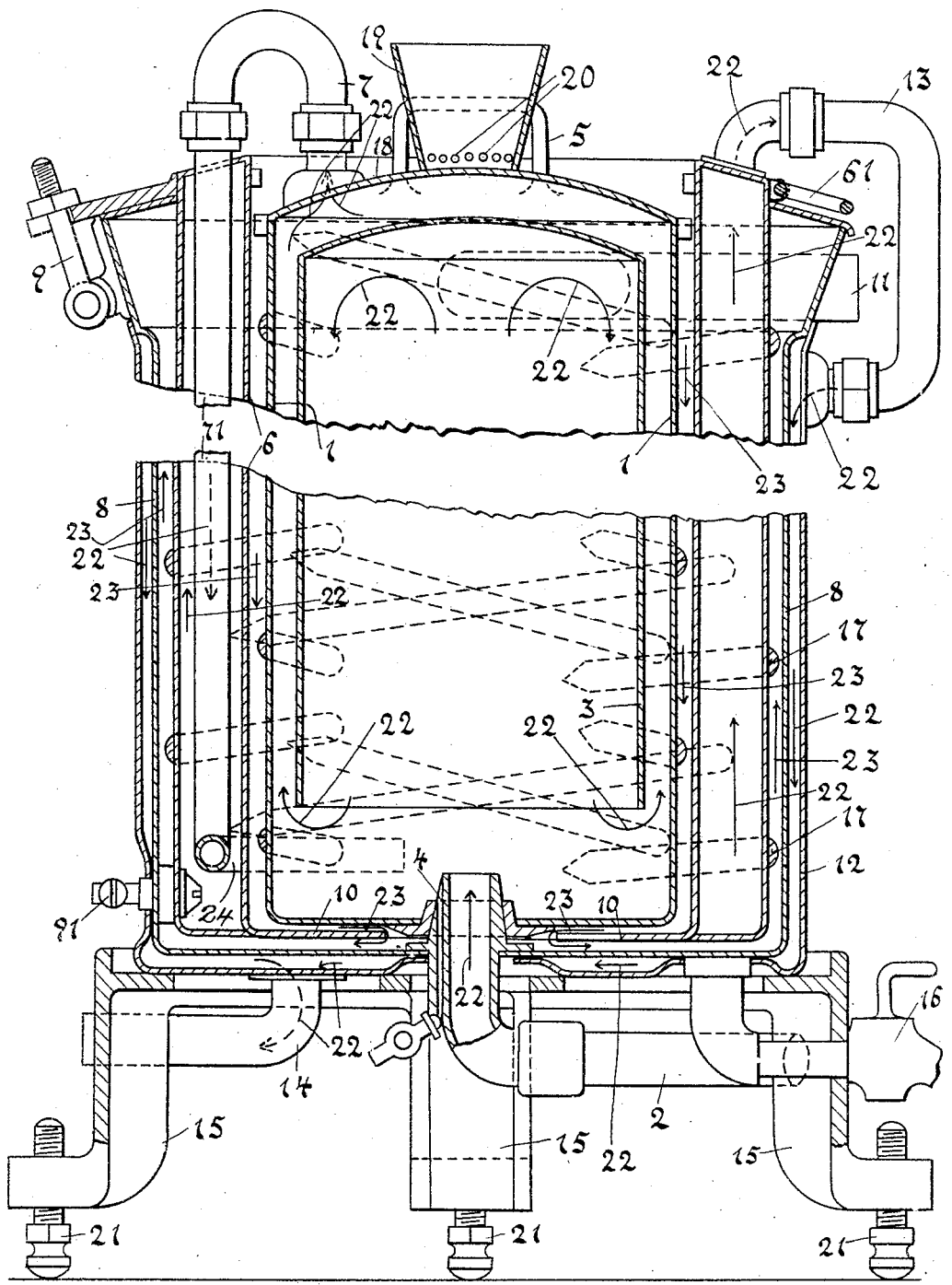

No. 779,498.

Patented January 10, 1905.

UNITED STATES PATENT OFFICE.

ALEXANDER THEODOR PFEIFF, OF STOCKHOLM, SWEDEN, ASSIGNOR TO AKTIEBOLAGET STERILISATOR, OF STOCKHOLM, SWEDEN.

STERILIZING APPARATUS.

SPECIFICATION forming part of Letters Patent No. 779,498, dated January 10, 1905.

Application filed August 15, 1903. Serial No. 169,671.

*To all whom it may concern:*

Be it known that I, ALEXANDER THEODOR PFEIFF, a subject of the King of Sweden and Norway, and a resident of Stockholm, Sweden, have invented new and useful Improvements in Sterilizing Apparatus, of which the following is a specification, reference being had to the drawing accompanying and forming a part hereof.

This invention relates to sterilizing apparatus, and more especially to such sterilizing apparatus which consists of a plurality of vessels arranged in one another and forming in and between themselves ring-shaped chambers through which the heating agent and the liquid to be sterilized flow in different channels.

The object of the invention is to provide a sterilizing apparatus of the said class which will be of such construction that the vessels may be easily taken apart for cleaning or the like and be again readily put together and which will be cheap to build and maintain, as well as reliable in its function.

The invention consists in the combinations and arrangements of parts hereinafter described and claimed.

In the accompanying drawing I have shown a vertical cross-section of an apparatus embodying my invention.

Referring to the drawing, the apparatus consists of an inner closed vessel 1, which is at the bottom provided with a pipe 2 for letting in the heating agent, hereinafter referred to as "steam," and inside the said vessel 1 is provided a holder 3 for distributing the steam and leading the same against the wall of the vessel 1. At the side of the said inlet-pipe 2 is arranged a channel 4 for drawing off the waste water accumulating in the said vessel 1. The cover 18 of the latter is convex and provided with a hopper 19, having a number of small outlet-holes 20 for the liquid to be sterilized. The said cover 18 is further provided with a handle 5 in order to facilitate the removing of the vessel 1 when the apparatus is to be taken apart. Outside the vessel 1 is arranged a second closed vessel 6, which is of ring-shaped horizontal section and connected to the vessel 1 by means of a removable pipe (or pipes) 7. The latter extends inside the vessel 6 by means of a pipe 71 almost to the bottom of the said vessel and is provided with a suitable distributing device—for instance, a cross-pipe 24—in order to uniformly distribute the steam in the lower part of the vessel 6. The latter, which is provided with handles 61 (only one shown in the drawing) for removing the vessel and with a cock 91 for drawing off the waste water, is loosely inserted in a cylindrical vessel 8 and secured to the same by means of pivoted screw-bolts 9 in such manner that the bottom of the vessel 6 will be held at a somewhat higher level than the bottom of the vessel 8. The bottom of the vessel 6 is provided with a ring-shaped inwardly-extending flange 10 for the purpose hereinafter set forth. The top of the vessel 8 is closed, but provided with an outlet 11 for the sterilized liquid. The last-mentioned vessel is arranged in a vessel 12, and at the top steam-tight, connected to the same. The ring-shaped chamber between the said vessels 8 and 12 communicates, by means of a removable pipe (or pipes) 13, with the vessel 6, so that the steam can flow from one of the said vessels to the other. The said pipes 7 and 13 may be secured by means of the usual pipe-couplings, or they may simply be inserted in the pipes fixed to the vessels. At the bottom the last-mentioned chamber is provided with an outlet-pipe 14 for the steam and the waste water.

The apparatus is mounted on a foot 15, provided with set-screws 21. On the outer sides of the vessels 1 and 6 are arranged helical ribs or projections for the purpose hereinafter set forth.

The above-described apparatus works as follows: During the sterilizing process the steam is continually let in through the pipe 2 and will be compelled by the holder 3 to flow toward the bottom before it can rise along the wall of the vessel 1. From the latter the steam will flow through the pipe (or pipes) 7 and the pipe (or pipes) 71 to the bottom of the vessel 6. After the steam has then passed this vessel upward it will flow through the pipe 13 into the chamber between the vessels 8 and 12, through which chamber it will flow downward to the outlet-pipe 14. The way of the steam now described is shown by arrows 22.

Inasmuch as the different chambers through which the steam will flow are in open communication with each other and with the atmosphere, it will be understood that the steam-pressure in the apparatus will not rise much above that of the atmosphere. The liquid to be sterilized, and which may be cream, milk, or the like, is poured into the hopper 19 and flows out through the holes 20 onto the cover 18 of the vessel 1 and down into the chamber between the vessels 1 and 6. After the liquid has passed the said chamber it will be compelled by the flange 10 to pass under the bottom of the vessel 1 and over the bottom of the vessel 8 before it reaches the chamber between the vessels 6 and 8. By means of the said flange 10 the essential advantage will be obtained that the liquid will be prevented to stop under the bottom of the vessel 1, which would easily cause the liquid to be burned. If a larger number of vessels is arranged within in each other, similar flanges are provided at each of the chambers to be passed by the liquid. Since such an arrangement will be easily understood without drawing, I have not illustrated the same. After the liquid has passed the chamber between the vessels 6 and 8 it will flow out through the outlet-pipe 11. The way of the liquid through the apparatus is shown by arrows 23. When the sterilizing process is concluded, the liquid remaining in the apparatus may be drawn off by a cock 16 or the like, arranged at the bottom of the apparatus.

By the above-described ribs or projections 17 the liquid will be caused to flow more rapidly in the apparatus and be better mixed than without such ribs or projections, which is an essential advantage in sterilizing cream and other liquids which cannot bear the stirring otherwise necessary to prevent the liquid from being burned.

Obviously the invention is not limited to three vessels placed within each other, inasmuch as any number of vessels may be used, as easily understood by those skilled in the art.

Having now described my invention and in what manner the same may be performed, what I claim as new, and desire to secure by Letters Patent, is—

In a sterilizing apparatus the combination of, an inner closed vessel, means for introducing a heating agent into the same, a ring-shaped closed vessel surrounding the said inner vessel, a flange projecting from the lower end of the last-mentioned vessel, a second ring-shaped closed vessel surrounding the first-mentioned ring-shaped vessel, pipe connections between said three vessels connecting them in series, an outlet for the heating agent on the last-mentioned ring-shaped vessel and helical ribs on the two first-mentioned vessels, the said vessels forming between them annular spaces which constitute the path of the liquid to be sterilized, substantially as and for the purpose set forth.

In testimony whereof I have signed my name to this specification in the presence of two subscribing witnesses.

ALEXANDER THEODOR PFEIFF.

Witnesses:
 EWALD DELMAR,
 KARL RUNCSKOG.